US011718560B2

(12) United States Patent
Seeley

(10) Patent No.: US 11,718,560 B2
(45) Date of Patent: Aug. 8, 2023

(54) COMPOSITE STRUCTURAL MATERIAL AND AGGREGATE THEREFOR

(71) Applicant: Seels Technology Pty Ltd, Magill (AU)

(72) Inventor: Stephen Seeley, Magill (AU)

(73) Assignee: SEELS TECHNOLOGY PTY LTD, Magill (AU)

(*) Notice: Subject to any disclaimer, the term of this patent is extended or adjusted under 35 U.S.C. 154(b) by 0 days.

(21) Appl. No.: 17/536,825

(22) Filed: Nov. 29, 2021

(65) Prior Publication Data

US 2022/0081361 A1     Mar. 17, 2022

Related U.S. Application Data

(63) Continuation of application No. 14/908,566, filed as application No. PCT/AU2014/000758 on Jul. 29, 2014, now abandoned.

(30) Foreign Application Priority Data

Jul. 29, 2013 (AU) .................................. 2013101024
Apr. 4, 2014 (AU) .................................. 2014901226

(51) Int. Cl.
| | | |
|---|---|---|
| *C04B 16/12* | (2006.01) | |
| *C04B 28/02* | (2006.01) | |
| *C04B 20/00* | (2006.01) | |
| *C04B 14/00* | (2006.01) | |
| *E04C 5/07* | (2006.01) | |

(52) U.S. Cl.
CPC ............ *C04B 16/12* (2013.01); *C04B 14/005* (2013.01); *C04B 20/0008* (2013.01); *C04B 28/02* (2013.01); *E04C 5/073* (2013.01); *Y02W 30/91* (2015.05)

(58) Field of Classification Search
CPC ..... C04B 20/0008; C04B 16/12; C04B 28/02; C04B 16/04; C04B 18/08; C04B 14/005; E04C 5/073; Y02W 30/91
See application file for complete search history.

(56) References Cited

U.S. PATENT DOCUMENTS

| | | |
|---|---|---|
| 3,846,085 A | 11/1974 | Dunn |
| 4,033,781 A | 7/1977 | Hauser et al. |
| 4,370,390 A | 1/1983 | Burk |
| 5,433,777 A | 7/1995 | Sheppard |

(Continued)

FOREIGN PATENT DOCUMENTS

| | | |
|---|---|---|
| AU | 2013101024 A4 | 10/2013 |
| EP | 0 126 167 A1 | 11/1984 |
| EP | 0 374 855 A2 | 6/1990 |

(Continued)

OTHER PUBLICATIONS

English language Abstract of JP54020034.
English language Abstract of JPH07-041344.
English language Abstract of J Ph 11-278894.

*Primary Examiner* — Shuangyi Abu Ali
(74) *Attorney, Agent, or Firm* — Ware, Fressola, Maguire & Barber LLP

(57) ABSTRACT

A composite structural material formed from aggregate within a matrix, the aggregate being a particulate material where each particle includes at least three radial legs extending outwardly from a central hub.

9 Claims, 2 Drawing Sheets

(56) References Cited

U.S. PATENT DOCUMENTS

2016/0296668 A1* 10/2016 Burden, Jr. .............. C09D 1/00

FOREIGN PATENT DOCUMENTS

| GB | 1 506 615 A | 4/1978 |
| JP | 54020034 | 2/1979 |
| JP | H07-041344 A | 2/1995 |
| JP | H11-278894 A | 10/1999 |
| WO | 94/08912 A2 | 4/1994 |
| WO | 01/66044 A2 | 9/2001 |

* cited by examiner

COMPOSITE STRUCTURAL MATERIAL AND AGGREGATE THEREFOR

CROSS-REFERENCE TO RELATED APPLICATIONS

This application is a continuation of and claims the benefit of and priority to co-pending U.S. application Ser. No. 14/908,566, filed Jan. 29, 2016, which claimed the benefit of and priority to Intl. Application No. PCT/AU2014/000758, filed Jul. 29, 2014, which claimed the benefit of and priority to Australian Application No. 2014901226, filed Apr. 4, 2014, and Australian Application No. 2013101024, filed Jul. 29, 2013, the disclosures of each of which are incorporated herein by reference in their entireties.

TECHNICAL FIELD

The present invention relates to a composite structural material of the type having an aggregate phase held within a matrix, such as a cementitious phase, and also to a new configuration of aggregate capable of forming an improved composite structural material.

BACKGROUND OF INVENTION

Composite structural materials utilising an aggregate to provide the composite structural material with a strength greater than the matrix alone (without the aggregate) are known. Concrete is a typical example of such a composite structural material.

There are many types of concrete available, created by varying the proportions of the main ingredients, such that the finished product can be tailored to its application with varying strength, density, or chemical and thermal resistance properties. Typically, concrete includes a cementitious binder to form the matrix, with water and often with a fine particulate material such as a sand, and an aggregate in the form of a coarse particulate material such as gravel, crushed stone (such as limestone or granite), crushed slag or recycled glass. Typically, the aggregate is general spherically-shaped and is reasonably dense.

The cementitious binder, usually simply referred to as "cement", is commonly Portland cement, although other cementitious materials such as fly ash and slag cement, can also serve as a binder for the aggregate.

Water is then mixed with a dry composite of the binder and the aggregate, which produces a semi-liquid that workers can shape (typically by pouring it into a form or mold). Chemical additives can also be added to achieve varied properties. For example, these additives may speed or slow down the rate at which the concrete hardens, and may impart other useful properties. The concrete then solidifies and hardens through a chemical process called hydration, with the water reacting with the cement, which bonds the other components together, creating a robust, "stone-like", composite structural material.

Concrete has relatively high compressive strength, but much lower tensile strength. For this reason, concrete is often reinforced with materials that are strong in tension (often steel). Also, the elasticity of concrete is relatively constant at low stress levels, but starts decreasing at higher stress levels as matrix cracking typically develops. Concrete has a very low coefficient of thermal expansion and tends to shrink as it matures. Therefore, all concrete structures tend to crack to some extent, due to shrinkage and tension.

Different mixes of concrete ingredients produce different strengths, usually measured in psi or MPa, and different strengths of concrete are used for different purposes. For example, very low-strength (15 MPa or less) concrete may be used when the concrete must be lightweight. Lightweight concrete is often achieved by adding air, foams, or lightweight aggregates, with the normal side effect that the strength is reduced. For most routine uses, 20 MPa to 30 MPa concrete is used. Concrete of 35 MPa is however readily commercially available as a more durable, although more expensive, option, often used for larger civil projects.

Strengths above 35 MPa are used for specific building elements. For example, the lower floor columns of high-rise concrete buildings may use concrete of 80 MPa or more, to keep the size of the columns small. Bridges may use long beams of 70 MPa concrete to lower the number of spans required. Occasionally, other structural needs may require even higher strength concrete. For example, if a structure must be very rigid, concrete of very high strength may be specified, even much stronger than is required to bear the service loads. Strengths as high as 130 MPa have been used commercially for these reasons.

Because the strength of concrete is adversely and significantly affected by the presence of voids in the hardened product, it is important to achieve the maximum possible density during hardening of the concrete mix. This requires the concrete mix to have sufficient "workability" to allow virtually full compaction using ideally only a reasonable amount of work (vibration). The presence of voids in concrete reduces its density and greatly reduces the strength—for instance, 5% of voids can lower the strength by as much as 30%. Also, the cost of labour, the quality of a finished product, and the ability to achieve products of certain types, are all impacted by the workability of a concrete mix, in terms of the concrete mix being easily placed, formed and compacted.

The workability of a pre-hardened concrete mixture, often regarded simply as measure of its "wetness", is thus actually a function of the internal work required to overcome the frictional forces between the various components of the concrete to permit full compaction and the removal of all voids, without undesirable bleeding or segregation.

A known technique for applying a numerical measure to the workability of a concrete mix is a "slump test", typically performed to check the consistency of a freshly made concrete mix with respect to the ease with which the concrete mix flows. The slump test looks at the behaviour of a compacted inverted cone (referred to as a "slump cone" or an "Abrams cone") of concrete under the action of gravity.

The cone is placed on a hard non-absorbent surface and is filled with fresh concrete in three stages, each time being tamped using a rod of standard dimensions. The cone is carefully lifted vertically upwards, so as not to disturb the concrete cone, and the concrete subsequently subsides. This subsidence is referred to as "slump", and is measured to the nearest 5 mm if the slump is <100 mm and measured to the nearest 10 mm if the slump is >100 mm.

The slumped concrete takes various shapes and, according to the profile of the slumped concrete, the slump is termed as "true slump", "shear slump" or "collapse slump". If a shear or collapse slump is the outcome, a fresh sample would be taken and the test repeated. A collapse slump is an indication of too wet a mix. Only a true slump is of any use in the test. Very dry mixes, having a slump in the range of 0 to 25 mm tend to be used in road making, and are low workability mixes; mixes having slump in the range of 10 to 40 mm tend to be used for foundations with light reinforcement, and are medium workability mixes; while mixes having a slump in the range of 50 to 100 mm are useful for normal reinforced concrete placed with vibration, and are regarded as high workability concrete mixes.

Typically, an increase in the volume of aggregate in a concrete mix lowers the workability, and the traditional view has been that the use of smooth and round aggregate increases the workability (while workability should reduce if angular and rough aggregate is used). The greater the size of the aggregate, the less water is required to lubricate it, meaning that extra water should be available for workability. In this respect, porous aggregates also require more water compared to non-porous aggregates to achieve the same degree of workability.

It has been recognised for many years that it would be advantageous to utilise recycled materials as the aggregate in concrete, to assist with society's desire to recycle waste materials (such as plastic waste materials), to avoid the over-use of natural resources (such as gravel and crushed stone), and of course to provide lighter, stronger and easier to use concretes.

U.S. Pat. No. 5,209,968 to J. S. Sweeney is an example of a composite structural material formed with a lightweight granulated scrap or waste plastic aggregate bonded together with a cementitious binder, albeit as the core element of a structure that also includes external composite material layers that utilise a fibrous non-woven web as an aggregate. The plastic aggregate of the core element is said to be formed from expanded polystyrene beads of generally spherical form, similar to the shape of a typical gravel aggregate used for concrete.

U.S. Pat. No. 4,778,718 to R. L. Nicholls is another example of a composite structural material having a cementitious matrix reinforced with a plastic aggregate, this time in the form of a plastic fabric uniformly distributed throughout.

The present invention aims to provide a new shape of aggregate that is capable of forming a composite structural material that is lighter than a typical composite structural material, while still exhibiting desirable workability and strength.

SUMMARY OF INVENTION

The present invention provides a composite structural material formed from aggregate within a matrix, the aggregate being a particulate material where each particle includes at least three radial legs extending outwardly from a central hub.

The present invention also provides an aggregate suitable for use in such a composite structural material, the aggregate being a particulate material where each particle includes at least three radial legs extending outwardly from a central hub.

The central hub of each aggregate particle will ideally have a spherical, cylindrical or cuboid shape, and may be a shape that approximates these shapes, such as will be referred to as generally spherical, generally cylindrical and generally cuboid.

In one form, the central hub will be generally spherical and will have a diameter in the range of 1 mm to 20 mm, preferably in the range of 2 mm to 15 mm, more preferably in the range of 3 mm to 12 mm, more preferably in the range of 5 mm to 10 mm. However, the central hub may be larger than 20 mm. Indeed, in applications where very large volumes of the composite structural material might be used, such as would be required for very large structures such as dam walls, it is envisaged that the central hub might be up to 20 cm (or more) in diameter In another form, the central hub will be generally cuboid and will have a width in the range of 1 mm to 20 mm, preferably in the range of 2 mm to 15 mm, more preferably in the range of 3 mm to 12 mm, more preferably in the range of 5 mm to 10 mm. However, again the central hub in this form may be larger than 20 mm, for reasons described above.

It is envisaged that each aggregate particle will have three legs, four legs, five legs, six legs, seven legs, eight legs, nine legs or ten legs. In a preferred form, the particles will have six legs.

In a preferred form, the legs will extend outwardly from the central hub so as to extend into three dimensions, with respect to Cartesian geometry and its representation of three dimensional space having three coordinate axes, with each axis perpendicular to the other two at their origin. Furthermore, the legs will preferably extend radially symmetrically outwardly from the central hub, or at least some of the legs will be arranged radially symmetrically. The legs may be of the same size and shape, or one or more legs may be of a different size and/or shape to other legs.

Ideally, the legs of the aggregate particles will be cylindrical, conical or frusto-conical, with the conical and frusto-conical versions either reducing or increasing in diameter away from the central hub, albeit preferably reducing in diameter away from the central hub. With this in mind, it is envisaged that a preferred form will see some legs shaped cylindrically and some legs shaped as a frusto-cone reducing in diameter away from the central hub. For example, in a preferred form that includes six legs, two legs may be cylindrical and four legs may be frusto-conical, or two legs may be frusto-conical with the other four legs also being frusto-conical but with a greater taper.

The free ends of the legs may be a flat surface or a curved surface (such as a convex or concave surface), or a combination of these. Alternatively, the free ends may include a frusto-conical tip, or may include a spherical tip, such as a bulbous spherical tip, being a tip where the diameter of the spherical tip is greater than the diameter of the leg at the point of connection between the tip and the leg.

In terms of leg length, it is preferred for all legs to have the same length. It is also envisaged that preferred ranges for leg lengths will be in the range of 1 mm to 20 mm, preferably in the range of 2 mm to 15 mm, more preferably in the range of 3 mm to 14 mm, more preferably in the range of 6 mm to 12 mm. However, the legs may be longer than 20 mm, and may have lengths of up to 20 cm in the high volume applications mentioned above.

In a preferred form, the length of each leg of an aggregate particle will be equal to or greater than the diameter/width of the central hub.

The legs will of course have a diameter or a width. In the form where the legs are cylindrical, conical or frusto-conical, that dimension will be regarded as a diameter, albeit one which will vary (decrease or increase) away from the central hub in the conical and frusto-conical embodiments. In a preferred form, each leg of an aggregate particle, at a location closest to the central hub, will have a diameter/width which is equal to or less than the diameter/width of the central hub. When less, the central hub will thus have exposed surface portions located between the legs, which surface portions may be dimpled or otherwise adapted to include a surface contour (such as a concavity) to assist with the physical interaction (encapsulation) of the aggregate with the matrix of the composite structural material.

However, it is also envisaged that the diameter/width of the central hub could be equal to the diameter/width of each leg, at least where the hub and the legs join, resulting in the central hub not having exposed surface portions of this type. In this form, the central hub might not be readily discernible when viewing the aggregate particles.

The aggregate particles will preferably be of a suitable plastic material, which may or may not be a recycled plastic material, such as polystyrene, high density polyethylene (HDPE), polyethylene terephthalate (PET), polyvinyl chloride (PVC), polycarbonates, polypropylene, or any high density plastic, and may be a mixture of materials. Similarly, the aggregate may include particles made of different plastic materials, such that some particles are, for example, of HDPE and some are of PVC. Alternatively, the aggregate may be formed from a non-plastic formable or moldable material such as fly ash, or at least formed from a plastic material plus a proportion of a non-plastic formable or moldable material.

The aggregate particles may be hollow, or at least partially hollow, or may be solid. It is envisaged that solid aggregate particles will be preferred.

The matrix of the composite structural material will most often be a cementitious binder such as Portland cement, or may be an energetically modified cement or a cement blend, or any other suitable and desirable form of cement. Indeed, the matrix may additionally be a polymer resin, a mud, bitumen, a metal or a ceramic. The matrix may also include a fine aggregate such as sand, and of course also water as mentioned above.

When initially mixed, cement and water rapidly form a gel of tangled chains of interlocking crystals, and components of the gel continue to react over time. Initially the gel is fluid, which improves workability and aids in placement of the material, but as the concrete sets, the chains of crystals join into a rigid structure, counteracting the fluidity of the gel and fixing the particles of aggregate in place. During curing, the cement continues to react with the residual water in a process of hydration. Once this curing process has terminated, the product has the desired physical and chemical properties.

As mentioned above, workability is the ability of a fresh concrete mix to fill a form/mold properly with the desired work (vibration) and without reducing the concrete's quality. Workability depends on water content, aggregate (shape and volume), cementitious content and age (level of hydration), and can be modified by adding chemical additives. Raising the water content or adding chemical additives increases concrete workability. Excessive water can lead to increased bleeding (surface water) and/or segregation of aggregates (when the cement and aggregates start to separate), with the resulting concrete having reduced quality. The use of a traditional aggregate with an undesirable gradation (size distribution) amongst the aggregate particles can result in an undesirable mix with a very low slump, which cannot readily be made more workable by the addition of reasonable amounts of water.

It has been found that the use of the inventive aggregate particles in a composite structural material does not hinder the composite structural material's mechanical properties. Also, and contrary to the traditional views of the expected role of the shape of aggregate particles, the use of the inventive aggregate particles has not been found to render the composite structural material less workable, nor does it result in deterioration of the composite structural material's durability.

To the contrary, the inventive shape of the aggregate particles has been found to allow for the formation of a composite structural material that can be lighter (benefiting from the lighter weight of the aggregate), yet has the required strength and workability. Without wishing to be bound by theory, it is likely that the directionality of the legs and the tendency for the aggregate particles to therefore approach a state of inter-digitating (or nearly so), giving rise to an improved mechanical interaction within the matrix between the aggregate particles, is responsible for the acceptable strength and workability combined with a relatively light weight.

This directionality of the legs is also believed to assist with minimising crack propagation throughout the hardened material, either arresting the cracks completely or deflecting them when encountered, giving rise to a final product that exhibits increased fracture toughness when compared to the same concrete mix with traditional aggregate.

Additionally, the aggregate particles have less "bulk" when compared to a traditional spherical (or nearly spherical) aggregate particle, meaning that they have less resistance to movement through the matrix when a concrete mix is being worked. Indeed, it has been found that during compaction, when workers aim to ensure that the aggregate in a concrete mix moves into the bulk of the mix and away from the surface, the lower "bulk" of the inventive aggregate particles (being a lower exposed, continuous surface area) causes the inventive aggregate particles to move easily away from the surface into the mix. Again without wishing to be bound by theory, it is believed that this also assists with ensuring the required strength and workability of a concrete in accordance with the present invention can be achieved.

In a preferred form, the composite structural material of the present invention will include an amount of aggregate of about 0.1% to 25% v/v, or from about 0.5% to 20% v/v, or form about 1.0% to 15% v/v. More preferably, the amount of aggregate will be in the range of about 2.0% to 7.5% v/v, or more preferably in the range of about 2.5% to 5.0% v/v.

DETAILED DESCRIPTION OF PREFERRED EMBODIMENTS

Figure 1:
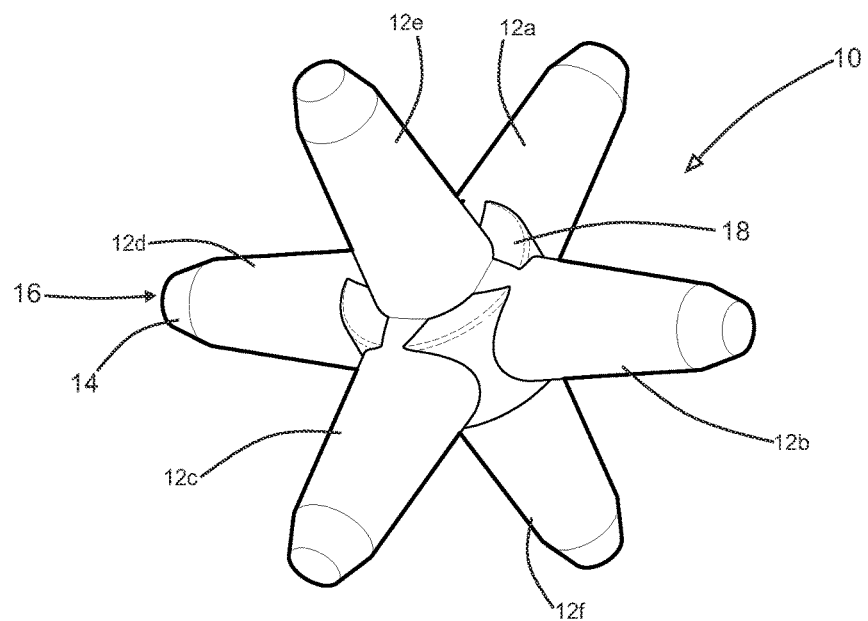
FIG. 1 is a perspective view from above of an aggregate particle in accordance with a first preferred embodiment of the present invention.
Figure 2:
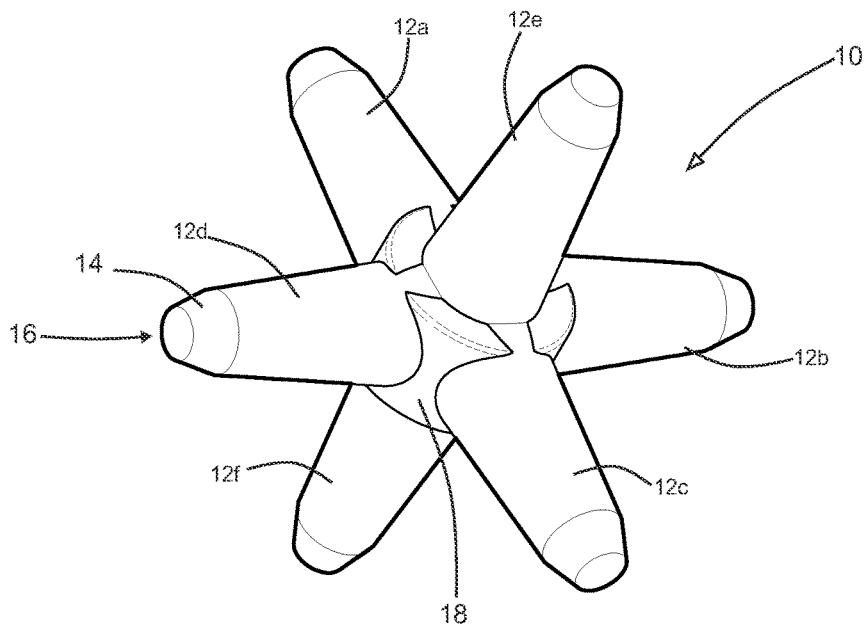
FIG. 2 is a perspective view from below of the embodiment of FIG. 1.

Illustrated in FIGS. 1 and 2 is a first embodiment of a particle 10 that can form an aggregate suitable for use in a composite structural material in accordance with the present invention. The particle 10 includes six radial legs 12 extending outwardly from a central hub 18, but as mentioned above there need only be more than three such legs.

The central hub 18 in this embodiment is of a generally cylindrical shape, having four of the six legs (12a, 12b, 12c, 12d) extending radially outwardly from the side wall of the hub 18 in two dimensions (which could be identified as the x and y coordinates in Cartesian geometry), and arranged symmetrically about that side wall. The remaining two legs (12e, 12f) extend radially outwardly from the end walls of the hub 18 in a third dimension (which could be identified as the z coordinate in Cartesian geometry). The six legs together thus extend radially outwardly to form a three dimensional particle 10.

The legs 12 of this embodiment are conical, reducing in diameter away from the hub 18. The free ends of the legs (illustrated by reference numerals on leg 12d) have a frusto-conical tip 14 ending in a flat surface 16.

Figure 3:
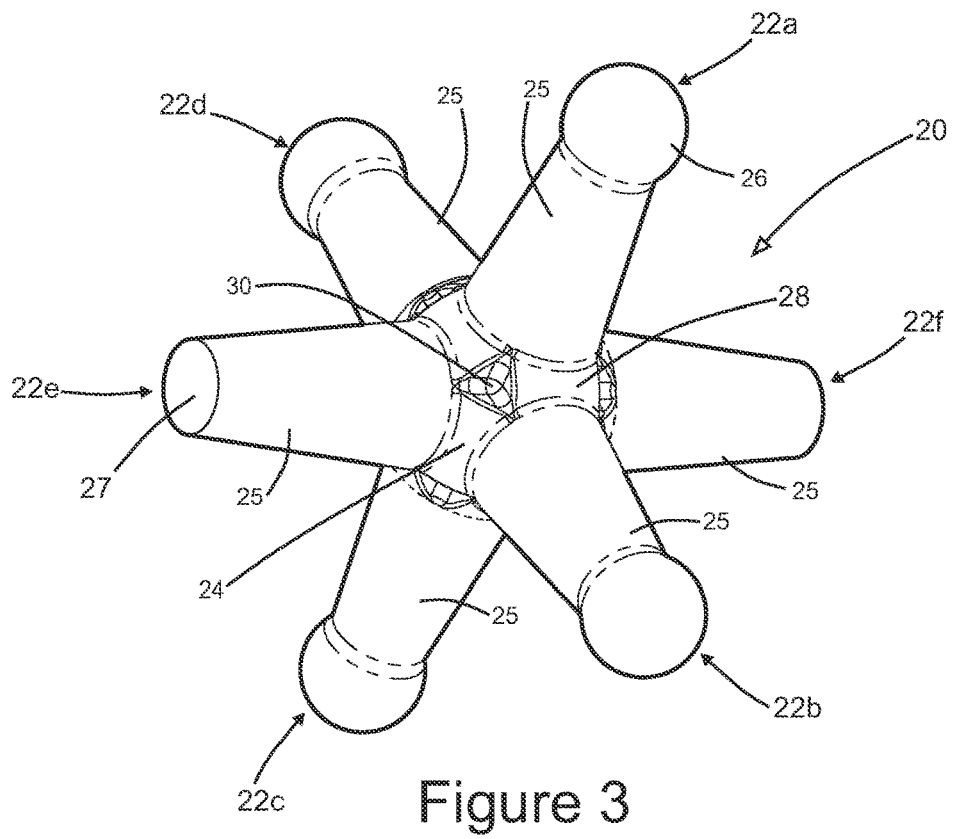
FIG. 3 is a perspective view from above of an aggregate particle in accordance with a second preferred embodiment of the present invention.
Figure 4:
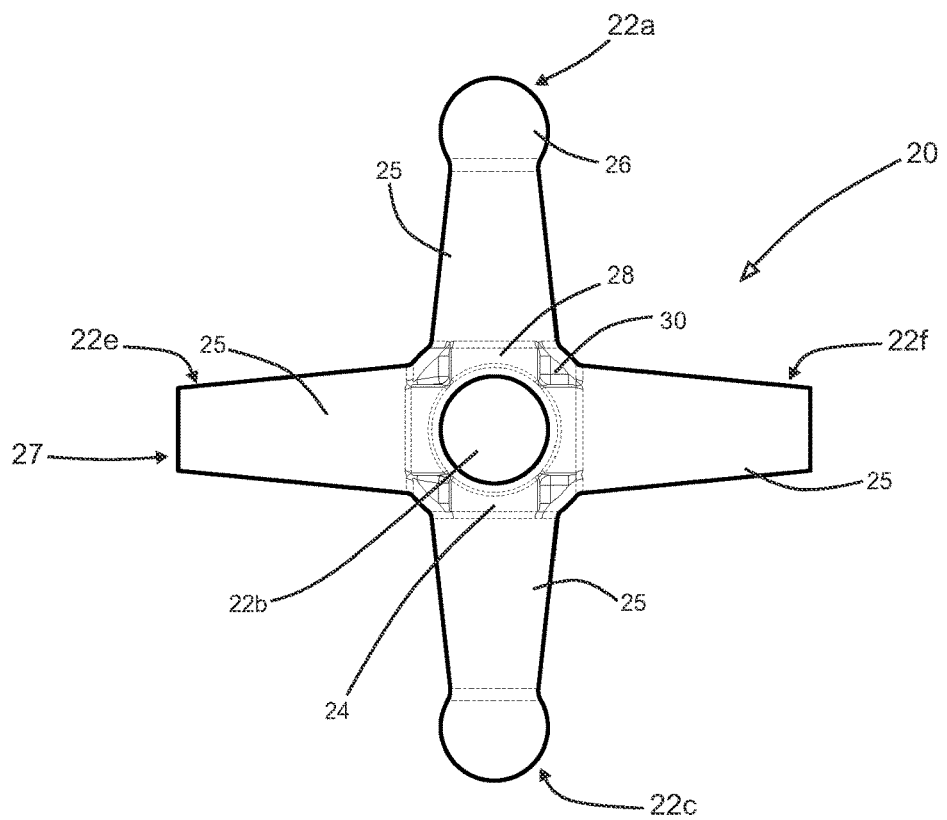
FIG. 4 is a side view of the embodiment of FIG. 3.

Illustrated in FIGS. 3 and 4 is a second embodiment of a particle 20 that also can form an aggregate suitable for use in a composite structural material in accordance with the present invention. The particle 20 again includes six radial legs 22, in this embodiment all extending outwardly from a central hub 24.

The central hub 24 in this embodiment is of a generally spherical shape, having the six legs (22a, 22b, 22c, 22d, 22e, 22f) extending radially outwardly from the hub 24 and arranged symmetrically about that hub 24 to form a three dimensional particle 20.

The legs 22 of the second embodiment all have conical portions 25, reducing in diameter away from the hub 24. The free ends of four of the legs (illustrated by reference numerals on leg 22a) have a bulbous spherical tip 26, whereas the free ends of the remaining two legs (22e, 22f) end in a flat surface 27.

The length of each leg 22 of the particle 20 is greater than the diameter of the central hub 24. In one version, the central hub 24 of the second embodiment has a diameter of 10 mm and the legs 24 are all 12 mm long, measured from the hub 24 to the tip of the tip 26 or the flat surface 27, as appropriate, making the overall width of the particle 20 34 mm. In this first version, the bulbous spherical tip 26 has a diameter of 5.2 mm and the flat surface 27 has a diameter of 4 mm.

In a second, smaller, version, the central hub 24 of the second embodiment can have a diameter of 5 mm and the legs 24 will all be 6 mm long, again measured from the hub 24 to the tip of the tip 26 or the flat surface 27, as appropriate, making the overall width of the smaller version of the particle 20 17 mm. In this second version, the bulbous spherical tip 26 has a diameter of 2.6 mm and the flat surface 27 has a diameter of 2 mm In both versions of the second embodiment, the diameter of the conical portion 25 of the legs 22 decreases away from the central hub 24. Each leg 22, at a location closest to the central hub 24, has a diameter which is less than the diameter of the central hub 24. Thus, the central hub 24 has exposed surface portions 28 located between the legs 22, which surface portions 28 include a concavity 30.

A composite structural material in accordance with the present invention was formed utilising a plurality of the larger (first) version of the second embodiment of the particle 20 as the aggregate. Each particle 20 had a weight of 1.39 g and a volume of 1.63 cm$^3$.

In a first example, the raw materials of cement, aggregate, sand and water were mixed, in the mix ratio of 14:1:31.76 (by weight), with a water to cement ratio of 0.564, to yield one cubic metre of concrete. Specifically, the example utilised 350 kg of cement, 25 kg of aggregate and 794 kg of sand. This yielded a volumetric proportion of the aggregate in the concrete of about 2.93%.

In a second example, the raw materials of cement, aggregate, sand and water were mixed in the mix ratio of 14:1:29.92 (by weight), with a water to cement ratio of 0.503, again to yield one cubic metre of concrete. Specifically, the example utilised 350 kg of cement, 25 kg of aggregate and 748 kg of sand. This again yielded a volumetric proportion of the aggregate in the concrete of about 2.93%.

In both examples, the cement was an Adelaide Brighton Cement Limited general purpose (GP) cement formed from Portland cement clinker and gypsum, and the aggregate was in the form of a plurality of the larger version of particles 20 illustrated in FIGS. 3 and 4.

The mixing process created a homogeneous mixture to ensure a consistent distribution of aggregate throughout the mix. The resultant density of the concrete of the first example was 2,151 kg/m$^3$, while the resultant density of the concrete of the second example was 2,129 kg/m$^3$, noting that a typical density for normal concrete is regarded as being between 2,300 and 2,400 kg/m$^3$, rendering the concrete of the examples about 10% lighter than such normal concrete.

To evaluate the mechanical properties of the concrete, such as the concrete's compressive strength and flexural strength, concrete test specimens were prepared for both examples in a cylindrical mold (diameter 100 mm and height 200 mm) and as a square beam (width 105 mm and length 355 mm) and air dried for about one day. Then, the samples were removed from the molds and cured for 27 days so that they were at the required age.

The compressive strength of the sample cylinders was 28.0 Mpa for the first example and 29.5 MPa for the second example. The flexural strength of the sample beams was 4.6 MPa for the first example and 4.7 MPa for the second example, being a Modulus of Rupture.

A slump test performed on the mix of the first example resulted in a slump of 100 mm, while a slump test performed on the mix of the second example resulted in a slump of 70 mm.

The composite structural material (the final concrete product) of both examples did not exhibit same loss of compressive and flexural strength as has often been witnessed in concretes made with plastic aggregate having a generally spherical shape akin to the typical shape of traditional aggregate materials such as stone and gravel. Also, visual observation of the sample cylinders and beams after compressive and flexural strength testing showed reduced crack development, again compared to traditional concrete with traditional aggregate.

Furthermore, after cutting the sample cylinders horizontally to show the aggregate distribution, virtually no segregation was apparent and there were no significant voids about the aggregate particles. Additionally, a reasonable degree of vibration was enough to allow the aggregate to settle into the concrete mix before curing, to move the aggregate away from the surface. Workability at slumps of 70 mm and 100 mm was regarded as a good outcome for use in forming normal reinforced concrete.

A person skilled in the art will understand that there may be variations and modifications other than those specifically described. It is to be understood that the invention includes all such variations and modifications. The invention also includes all steps, features, compositions and compounds referred to, or indicated in this specification, individually or collectively, and any and all combinations of any two or more of the steps or features.

The claims defining the invention are as follows:

1. A composite structural material in the form of concrete for making a concrete structure comprising:
   an aggregate; and
   a cementitious binder having a Portland cement, a slag cement or a fly ash to combine with the aggregate to form the concrete, the aggregate being a particulate material where each particle includes at least three radial legs extending into three dimensions outwardly from a central hub to form three dimensional aggregate particles, the at least three radial legs having a diameter, at a location closest to the central hub, which is less than the diameter or width of the central hub, the central hub having a spherical shape, a cylindrical shape, or a cuboid shape and having exposed surface portions located between the at least three radial legs, which exposed surface portions include a surface contour, whereby the composite structural material includes an amount of aggregate of 2.0% to 7.5% v/v.

2. A composite structural material according to claim 1, including an amount of aggregate of 2.5% to 5.0% v/v.

3. A composite structural material according to claim 1, wherein the legs are of the same size and shape, or wherein one or more legs are of a different size and/or shape to other legs.

4. A composite structural material according to claim 1, wherein the legs are cylindrical, conical or frusto-conical, with the conical and frusto-conical versions reducing in diameter away from the central hub.

5. A composite structural material according to claim 4, wherein some legs are shaped cylindrically and some legs are shaped as a frusto-cone.

6. A composite structural material according to claim 1, wherein the free ends of the legs have either a flat surface, or a curved surface, or a bulbous spherical tip, or are pointed.

7. A composite structural material according to claim 1, wherein the central hub is spherical and has a diameter in the range of 1 mm to 10 mm, or is cylindrical and has a width in the range of 1 mm to 10 mm.

8. A composite structural material according to claim 1, wherein the surface contour is a concavity.

9. A composite structural material according to claim 1, wherein the aggregate particles are made of a plastic material selected from a group consisting of polystyrene, high density polyethylene (HDPE), polyethylene terephthalate (PET), polyvinyl chloride (PVC), polycarbonates, or polypropylene.

* * * * *